2,930,701
POWDERED ALGINATE JELLY COMPOSITION AND METHOD OF PREPARING THE SAME

Robert Ralph Merton and Richard Henry McDowell, London, England, assignors to Alginate Industries Limited, London, England, a company of Great Britain No Drawing. Application February 3, 1958
Serial No. 712,658

Claims priority, application Great Britain
February 14, 1957

26 Claims. (Cl. 99—131)

This invention comprises improvements in or relating to the production of alginate jellies and the like.

Many attempts have been made to arrive at a composition based on alginates suitable for the preparation by the housewife of table jellies and the like, but no means have hitherto been put forward enabling a product having the following characteristics to be produced:

(1) The composition should be a "one packet" composition, that is to say that all the ingredients should be mixed together in powder form, prior to making up merely by mixing with cold water.

(2) It should contain, apart from alginates, only materials which are stable on storage.

(3) It should produce a jelly having a sufficiently acid flavor.

Other desirable characteristics are:

(4) It should work satisfactorily over a wide range of hardness of water.

(5) It should be comparatively quick setting.

(6) It should turn easily out of the mold.

(7) It should have pleasant flavor and smooth texture in the mouth.

The preparation of alginate jellies, is known for example from United States Patent No. 2,441,719 but the methods described, while meeting various combinations of the first three characteristics (which are the most important) do not provide for the attainment of all three by means of any one composition.

The patent can be summed up as covering a method of making a jelly based on the inclusion of four fundamental components:

(1) A water soluble alginate: for example sodium alginate.

(2) A sparingly soluble salt, the cation of which will insolubilize the alginate: for example calcium phosphate.

(3) Either a free acid to be added as a separate step: for example citric acid; or a substance which can be mixed in the composition and which liberates acid slowly in water: for example glucono delta lactone.

(4) A water soluble alkali metal metal salt of a weak acid: for example a sodium phosphate.

Thus, the choices which the prior patent offers are either a two stage process of making alginate gels according to which of all the ingedients except the acidic component are first dissolved in water, and the acidic component is then added as a separate step, or a one stage or "one packet" composition in which the acidic component is a substance which liberates hydrogen ions only slowly in water, but in which the example given, glucono delta lactone, is unstable on storage.

We have found that by selecting an alkali metal carbonate from the many water soluble alkali metal salts of weak acids which exist, we are then able to include a free acid such as citric acid in our composition, and thus achieve a product which has all the first three of the above stated characteristics.

According to our invention therefore, a powdered product, which will dissolve in fresh water and will subsequently set to a jelly, comprises a water soluble salt of alginic acid, one or more salts whose cations form a water insoluble salt with alginic acid and which has a solubility product not exceeding $10^{-4}$ at 25° C., an alkali carbonate and an edible solid acidic substance.

Preferably the acidic substance is one which liberates hydrogen ions immediately on contact with water.

A further advantage in the selection of an alkali metal carbonate, besides enabling a free acid to be included in the powder mix, is that upon reacting with acid when the compound is mixed with water, carbon dioxide is generated so as to produce a multiplicity of fine bubbles throughout the system. By so balancing the proportions of the ingredients of the compound that some gelling takes place soon after mixing with water, these bubbles are trapped so that when gelation is complete the jelly contains a multiplicity of well-distributed fine bubbles. Not only does the presence of bubbles of carbon dioxide produce a pleasant sensation on the palate (cf. soda water) but they so modify the consistency of the product as to overcome a defect hitherto associated with alignate jellies. Alginate jellies unlike those made from gelatine, do not melt in the mouth. This has hitherto made them less acceptable to the consumers. The presence of the bubbles does not of course make the jelly melt in the mouth, but it does improve the eating quality to a wholly acceptable point.

To assist in the rapid dispersion of the active materials in water, when the product is used, the active gelling ingredients can be mixed with a major proportion of a dispersing agent such as sugar.

To obtain the most satisfactory results it is essential that the water soluble alginate should dissolve completely in the water before setting takes place to any appreciable extent. One factor which contributes to this result is that the soluble alginate should have a small particle size. The particles should certainly pass a sieve having 100 meshes to the lineal inch, and should preferably pass a sieve with 240 mesh to the lineal inch. It will be appreciated that most powdered products which will pass through such a sieve will contain a considerable proportion of much smaller particles, and in this application the presence of these small particles is advantageous. One method of producing a fine particle size is by milling but an equivalent result can be obtained by spray drying a solution of the soluble alginate, preferably containing also another edible neutral compound such as glucose.

A method of preparing the powder which is particularly advantageous is to mix at least part of the alkali metal carbonate with the alginate in the moist state and then to dry and mill the resulting paste. Some of the sugar or other dispersing agent can also be mixed into the wet paste and the dry powdered material should preferably pass a screen having 200 mesh to the lineal inch.

One difficulty previously encountered in the preparation of one powder mix alginate jellies is that variations in the calcium hardness of the water used have altered the time taken for setting so seriously that it was not practical to use one formula with water sources having greatly different degrees of hardness.

It will be realized in this context that the time elapsing before the mixture has developed a tenuous structure capable of holding in suspension gas bubbles or sparingly soluble reactive compounds, the time within which manipulation must be completed if a broken set is to be avoided, and the time which must elapse before the jelly is strong enough to turn out of a mold are all of importance.

From the examples given below it will be seen that by the means described we have arrived at a product which behaves satisfactorily when used with water sources having a considerable range of hardness, without losing any of the aforesaid advantages.

A solubility product of $10^{-4}$ at 25° C. sets an upper limit for the solubility in water of the salt whose cations form a water-insoluble salt with alginic acid, but further considerations may govern the choice of a suitable salt. A calcium salt is preferred and of these the carbonate, tartrate, citrate, sulphate, dicalcium orthophosphate and tricalcium orthophosphate have been found particularly suitable. In general the calcium salt will be used in the form of a powder passing a sieve with 200 meshes to the lineal inch, but depending on the rate of reactivity required it may be desirable for example to use the salt in form of particles passing a 200 mesh sieve but remaining on a 300 mesh sieve, or alternatively with particles passing 300 mesh. In general, for a given substance, the finer the particle size the more quickly will it react, but other factors, for example the crystal form, may be important.

We have found moreover that improved control over the setting time in water of different degrees of hardness can be obtained by including, instead of a single salt, the cations of which will react with the alginate to form a water-insoluble salt, a mixture of two or more salts which will react with the alginate at different rates in the conditions prevailing. The proportions of the two calcium salts used should be determined on samples from the actual manufacturer's batches of the salts which are to be used on the production scale.

By choosing a carbonate as a sparingly soluble salt the cation of which will form an insoluble alginate for example calcium carbonate the advantage which can be obtained if desired of generation, and trapping carbon dioxide bubbles is enhanced. It should be noted, however, that should the trapping of bubbles not be required this can be avoided by varying the choice or proportion of the ingredients so that the initial setting is slow enough to allow bubbles to escape from the system before gelling takes place. In the case of calcium carbonate we have found that the kind prepared by precipitation from solution is most suitable as a slowly reacting salt. It can be used, if desired, in conjunction with a salt such as tricalcium phosphate which reacts more quickly.

The following examples show specific instances of the carrying out of the invention:

*Example I*

The sodium alginate used in this example was prepared from alginic acid which had been leached with acid to contain less than 0.2% of calcium by reaction with an equivalent amount of sodium carbonate. The sodium alginate paste thus formed was dried to a moisture content of 8% and milled until it passed a sieve with 240 meshes to the lineal inch. The powder was then blended to give a mixture of the following composition:

| | Parts by weight, g. |
|---|---|
| Sodium alginate, 240 mesh | 46 |
| Sodium carbonate anhydrous | 20 |
| Tricalcium phosphate | 6 |
| Pulverized sugar | 800 |
| Anhydrous citric acid | 50 |
| Strawberry flavor (powder) | 1.6 |
| Red color (powder) | 0.4 |
| | 924.0 |

93 grams of this powder were added to 500 cc. of water of 20° hardness (as parts $CaCO_3$ per 100,000) and agitated with a hand operated rotary whisk for 30 seconds. The thickened solution was then poured into a mold to set, and turned out after 20 minutes. The resulting jelly had a mildly acid flavor and a small proportion of carbon dioxide bubbles.

*Example II*

Alginic acid was prepared by known methods and neutralized with sodium carbonate to give 200 lbs. moist sodium alginate which contained 80 lbs. of dry solids. To this was added 24 lbs. anhydrous sodium carbonate and 80 lbs. sugar. The pasty mass was made uniform by the action of a mixer of the Werner-Pfleiderer type, and was then broken up and dried to a dry matter content of 92%. The dry material was then milled to pass a screen having 200 mesh to the lineal inch and had the composition:

| | Parts by weight |
|---|---|
| Sodium alginate | 40 |
| Sugar | 40 |
| Sodium carbonate | 12 |
| Moisture | 8 |
| | 100 |

A solution of the product in water, made up to contain 1% by weight of dry sodium alginate had a viscosity of 90 centistokes at 25° C.

The powder was then used to make a dry-mixture of the following composition:

| | Parts by weight |
|---|---|
| Alginate/sugar/sodium carbonate powder | 100 |
| Anhydrous sodium carbonate | 10 |
| Anhydrous citric acid | 49 |
| Anhydrous calcium monohydrogen orthophosphate | 12 |
| Pulverized sugar | 800 |
| Orange flavor (powder) | 8 |
| Orange color (powder) | 2 |
| | 981 |

This mixture was made into jellies with two different sources of water by the following method. To 500 cc. of the cold water was added 98 grams of the mixture, stirring well with a spoon. A uniform mixture was obtained in 45 seconds and it was poured into a mold to set.

Results were as follows:

*Distilled water.*—Setting started in 2½ minutes, turned out of the mold easily to give a good jelly after 30 mins.

*Water of 20° temporary calcium hardness.*—Setting started in 1¼ minutes, turned out of the mold easily to give a good jelly after 30 mins.

The jellies had a mildly acid flavor and contained a small proportion of carbon dioxide bubbles.

*Example III*

The 200 mesh alginate/sugar/sodium carbonate powder as described in Example II was used to make the following mixture:

| | Parts by weight |
|---|---|
| Alginate/sugar/sodium carbonate powder | 110 |
| Anhydrous sodium carbonate | 14 |
| Tartaric acid | 60 |
| Calcium lactate pentahydrate | 3 |
| Calcium carbonate | 4 |
| Pulverized sugar | 800 |
| Strawberry flavor (powder) | 1.6 |
| Color | 0.4 |
| | 993.0 |

98 gms. of this mixture was incorporated into 500 cc. of cold water using a hand operated rotary whisk, and after 15 secs. the mixture was poured into a mold to set. Results were as follows:

*Distilled water.*—Setting started in 1 minute. A good jelly turned out after 10 minutes.

*Water of 20° temporary calcium hardness.*—Setting started in 30 secs. Good jelly turned out after 10 minutes.

*Water of 30° permanent calcium hardness.*—Setting started in 20 secs. Good jelly turned out after 10 minutes.

All these jellies had a strongly acid flavor and contained a large number of air and carbon dioxide bubbles.

Example IV

The 200 mesh alginate/sugar/sodium carbonate powder as described in Example III were made into a powder mix as follows:

| | Parts by weight |
|---|---|
| Alginate/sugar/sodium carbonate powder | 110 |
| Anhydrous sodium carbonate | 14 |
| Anhydrous citric acid | 80 |
| Tricalcium orthophosphate | 4 |
| Calcium carbonate | 2 |
| Pulverized sugar | 800 |
| Orange flavor (powder) | 8 |
| Color (powder) | 2 |
| | 1020 |

102 grams of this mixture was incorporated into 500 cc. of cold water using a hand operated rotary whisk, and after 15 secs. the mixture was poured into a mold to set.

With water from 0 to 30 degrees of calcium hardness, setting started in less than a minute and a good jelly could be turned out in ten minutes.

The jellies had an acid flavor and a pleasing texture due to the presence of bubbles of air and carbon dioxide.

Example V

This is similar to Example IV except that smaller amounts of sodium carbonate and citric acid are used. The mixture had the following composition:

| | Parts by weight |
|---|---|
| Alginate/sugar/sodium carbonate powder | 110 |
| Anhydrous sodium carbonate | 8 |
| Anhydrous citric acid | 28 |
| Tricalcium phosphate | 4 |
| Calcium carbonate | 2 |
| Pulverized sugar | 800 |
| Orange flavor (powder) | 8 |
| Color (powder) | 2 |
| | 962 |

96 grams of this powder were used in 500 cc. water, as in the previous examples. Setting started within one minute and good jellies were easily turned out in 10 minutes.

The flavor was mildly acid and had a desirable freshness and texture due to the presence of bubbles.

Although the use of cold water to prepare jellies presents the greatest practical advantages, our invention is not limited to the use of cold water, and the preparation of jellies using hot water is also envisaged.

It is to be understood that in referring to alkali metal carbonates the bicarbonates of the alkali metals are included.

It is to be understood further that provided an alkali carbonate is present in the mix, other alkali metal salts of weak acids can be included if desired, as the presence of the alkali carbonate allows a free acid to be used in a one powder mix.

Although any edible acid in powder form can be used in the powder we find that anhydrous citric acid is particularly suitable.

The expression "fresh water" means water such as the fresh potable water such as is normally supplied for domestic use, that is, with a calcium hardness range of between 0 and 30 expressed as parts of $CaCO_2$ per 100,000 of water.

We claim:

1. A powdered product which will dissolve in fresh water and will subsequently set to a jelly comprising a water soluble salt of alginic acid, a salt whose cations form a water insoluble salt with alginic acid and which has a solubility product not exceeding $10^{-4}$ at 25° C., an alkali carbonate and an edible solid organic free acid.

2. A powdered product as claimed in claim 1 wherein the organic free acid is one which liberates hydrogen ions immediately on contact with water.

3. A powdered product as claimed in claim 1 wherein the organic free acid is citric acid.

4. A product as claimed in claim 1 wherein the organic free acid is anhydrous citric acid.

5. A product as claimed in claim 1 wherein the ingredients are mixed also with a major proportion of a dispersing agent such as sugar, for the purpose described.

6. A product as claimed in claim 1 wherein the water soluble salt of alginic acid is sodium alginate.

7. A product as claimed in claim 1 wherein the water soluble salt of alginic acid is sodium alginate having a calcium content not exceeding 0.2%.

8. A powdered product which will dissolve in fresh water and will subsequently set to a jelly comprising a water soluble salt of alginic acid, a salt whose cations form a water insoluble salt with alginic acid and which has a solubility product not exceeding $10^{-4}$ at 25° C., a sodium carbonate and an edible solid organic free acid.

9. A powdered product as claimed in claim 8 wherein the organic free acid is citric acid.

10. A product as claimed in claim 9 wherein the ingredients are mixed also with a major proportion of a dispersing agent such as sugar, for the purpose described.

11. A product as claimed in claim 10 wherein the water soluble salt of alginic acid is sodium alginate.

12. A product as claimed in claim 10 wherein the water soluble salt of alginic acid is sodium alginate having a calcium content not exceeding 0.2%.

13. A powdered product which will dissolve in fresh water and subsequently set to a jelly comprising a water soluble salt of alginic acid, a calcium salt whose cations form a water insoluble salt with alginic acid and which has a solubility product not exceeding $10^{-4}$ at 25° C., an alkali carbonate and an edible solid organic free acid.

14. A product as claimed in claim 13 wherein the calcium salt is selected from the group containing the carbonate, tartrate, citrate, sulphate and di or tri-calcium orthophosphate.

15. A product as claimed in claim 14 wherein the calcium salt is present in a fineness of not less than that which will pass a screen of 200 meshes to the lineal inch.

16. A powdered product as claimed in claim 15 wherein the acidic substance is one which liberates hydrogen ions immediately on contact with water.

17. A powdered product as claimed in claim 15 wherein the organic free acid is citric acid.

18. A product as claimed in claim 17 wherein the ingredients are mixed also with a major proportion of a dispersing agent such as sugar, for the purpose described.

19. A product as claimed in claim 18 wherein the water soluble salt of alginic acid is sodium alginate.

20. A powdered product which will dissolve in fresh water and subsequently set to a jelly comprising a water soluble salt of alginic acid, a salt whose cations form a water insoluble salt with alginic acid and which has a solubility product not exceeding $10^{-4}$ at 25° C., selected from the group consisting of calcium carbonate, calcium tartrate, calcium citrate, calcium sulphate, di-calcium-ortho-phosphate and tri-calcium-ortho-phosphate; an alkali carbonate and an edible solid organic free acid, wherein the calcium salt is present in a fineness such that it will pass through a screen having 300 meshes to the lineal inch.

21. A product as claimed in claim 20 wherein the calcium salt employed consists of a mixture of calcium salts which will react with the alginate at different rates.

22. A product as claimed in claim 20 wherein the calcium salt consists of a mixture of calcium carbonate and tri-calcium phosphate.

23. A powdered product which will dissolve in fresh water and will subsequently set to a jelly comprising a water soluble salt of alginic acid, a salt whose cations form a water insoluble salt with alginic acid and which has a solubility product not exceeding $10^{-4}$ at 25° C., an alkali carbonate and an edible solid organic free acid, wherein the salt of alginic acid is present in the degree of fineness such that it will pass a screen having 100 meshes to the lineal inch.

24. A powdered product which will dissolve in fresh water and will subsequently set to a jelly comprising a water soluble salt of alginic acid, a salt whose cations form a water insoluble salt with alginic acid and which has a solubility product not exceeding $10^{-4}$ at 25° C., an alkali carbonate and an edible solid organic free acid, wherein the salt of alginic acid is present in a degree of fineness such as will pass a screen having 240 meshes to the lineal inch.

25. A method of preparing a product which will dissolve in fresh water and cause it to set to a jelly, wherein a water soluble salt of alginic acid is taken, in a moist state and mixed with alkali metal carbonate to form a paste, the paste is dried and the dry mixture then milled until the alginate is in a fine state of division, and thereupon a salt whose cations form a water insoluble salt with alginic acid and which has a solubility product not exceeding $10^{-4}$ at 25° C. and an edible solid acidic substance is mixed with the milled product.

26. A method as claimed in claim 25, wherein a dispersing agent, for example sugar, is mixed with the alginate and alkali metal carbonate before drying.

References Cited in the file of this patent

UNITED STATES PATENTS

| | | |
|---|---|---|
| 2,441,729 | Steiner | May 18, 1948 |
| 2,808,337 | Gibsen | Oct. 1, 1957 |